US008862774B2

(12) United States Patent
Vasseur et al.

(10) Patent No.: US 8,862,774 B2
(45) Date of Patent: Oct. 14, 2014

(54) DYNAMIC KEEPALIVE PARAMETERS FOR REVERSE PATH VALIDATION IN COMPUTER NETWORKS

(75) Inventors: Jean-Philippe Vasseur, Saint Martin d'Uriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 13/230,373

(22) Filed: Sep. 12, 2011

(65) Prior Publication Data

US 2013/0067063 A1 Mar. 14, 2013

(51) Int. Cl.
| | |
|---|---|
| *G06F 15/173* | (2006.01) |
| *H04L 12/721* | (2013.01) |
| *H04L 12/703* | (2013.01) |
| *H04L 12/751* | (2013.01) |
| *H04L 12/707* | (2013.01) |
| *H04L 12/761* | (2013.01) |

(52) U.S. Cl.
CPC .............. *H04L 45/026* (2013.01); *H04L 45/36* (2013.01); *H04L 45/28* (2013.01); *H04L 45/70* (2013.01); *H04L 45/22* (2013.01); *H04L 45/16* (2013.01)
USPC ........... 709/239; 709/224; 709/238; 709/243; 709/246; 370/241; 370/248

(58) Field of Classification Search
CPC ....... H04L 45/00; H04L 45/02; H04L 45/026; H04L 45/16; H04L 45/22; H04L 45/28; H04L 45/70; H04L 43/10; H04L 49/25; H04L 45/36

USPC ......... 709/203, 223, 230, 238, 242, 245, 224, 709/229, 246, 239, 243; 370/338, 241, 248, 370/351, 389
See application file for complete search history.

(56) References Cited

U.S. PATENT DOCUMENTS

| | | | | |
|---|---|---|---|---|
| 5,542,047 A | * | 7/1996 | Armstrong | .................... 709/224 |
| 5,926,463 A | * | 7/1999 | Ahearn et al. | ................ 370/254 |
| 6,404,755 B1 | * | 6/2002 | Schafer | ........................ 370/338 |

(Continued)

FOREIGN PATENT DOCUMENTS

EP            1107519 A2     6/2001

OTHER PUBLICATIONS

Finnie, et al., "Notification of Transmittal of the International Search Report and the Written Opinion of the International Searching Authority, or the Declaration", Patent Cooperation Treaty, Nov. 23, 2012, 15 pages, European Patent Office, Rijswijk, Netherlands.

(Continued)

*Primary Examiner* — Ramy M Osman
(74) *Attorney, Agent, or Firm* — Edwards Wildman Palmer LLP; James M. Behmke; Steven M. Jensen

(57) ABSTRACT

In one embodiment, a network device determines a path from itself to a source device in a computer network, where the source device utilizes the path in reverse to reach the network device. Based on determining a reliability of the path in reverse, the network device may dynamically adjust one or more keepalive parameters for keepalive messages sent on the path. Accordingly, the network device may then send keepalive messages on the path based on the dynamically adjusted keepalive parameters.

24 Claims, 13 Drawing Sheets

(56) References Cited

U.S. PATENT DOCUMENTS

| | | |
|---|---|---|
| 6,538,988 B1 | 3/2003 | Natarajan et al. |
| 6,658,595 B1 | 12/2003 | Thamattoor |
| 6,778,496 B1 * | 8/2004 | Meempat et al. ............ 370/238 |
| 7,065,268 B2 | 6/2006 | Prairie et al. |
| 7,342,897 B1 | 3/2008 | Nader et al. |
| 7,583,593 B2 | 9/2009 | Guichard et al. |
| 7,626,948 B1 | 12/2009 | Cook et al. |
| 7,768,996 B1 | 8/2010 | Fourie et al. |
| 7,860,025 B2 | 12/2010 | Thubert et al. |
| 7,912,934 B1 | 3/2011 | Melton et al. |
| 7,990,888 B2 | 8/2011 | Nadeau et al. |
| 8,023,477 B2 * | 9/2011 | Dosa et al. .................... 370/338 |
| 8,107,949 B1 * | 1/2012 | Wang ............................ 455/423 |
| 8,161,193 B1 * | 4/2012 | Cain ............................. 709/224 |
| 8,326,985 B2 * | 12/2012 | Luna et al. .................... 709/224 |
| 8,681,641 B1 * | 3/2014 | Sajassi et al. ................. 370/249 |
| 2004/0128538 A1 * | 7/2004 | Gmuender et al. .......... 709/229 |
| 2005/0083835 A1 | 4/2005 | Prairie et al. |
| 2006/0002306 A1 * | 1/2006 | Brown et al. ................. 370/241 |
| 2007/0140193 A1 * | 6/2007 | Dosa et al. .................... 370/338 |
| 2008/0069099 A1 * | 3/2008 | Tani et al. ..................... 370/390 |
| 2008/0130560 A1 * | 6/2008 | Khandekar et al. .......... 370/329 |
| 2008/0298304 A1 | 12/2008 | Yagyu et al. |
| 2009/0017810 A1 * | 1/2009 | Harsch .......................... 455/418 |
| 2009/0067407 A1 * | 3/2009 | Jia et al. ........................ 370/350 |
| 2009/0154345 A1 * | 6/2009 | Schollmeier et al. ......... 370/228 |
| 2010/0097943 A1 * | 4/2010 | D'Souza et al. .............. 370/248 |
| 2010/0124211 A1 * | 5/2010 | Payyappilly et al. ......... 370/338 |
| 2010/0235543 A1 * | 9/2010 | Gmuender et al. ........... 709/246 |
| 2012/0051231 A1 * | 3/2012 | Ou ................................ 370/248 |
| 2012/0128000 A1 * | 5/2012 | Baillargeon et al. .......... 370/392 |
| 2013/0034097 A1 * | 2/2013 | Dharmapurikar et al. .... 370/390 |
| 2013/0219045 A1 * | 8/2013 | Agarwal et al. ............... 709/224 |

OTHER PUBLICATIONS

Goyal, M., "A Distance Vector Protocol for Routing Over Low Power and Lossy Networks", Internet Engineering Task Force, Internet Draft, draft-goyal-rol-dv-00, Jun. 26, 2009, 9 pages, The Internet Engineering Task Force Trust.

Levis, et al., "Overview of Existing Routing Protocols for Low Power and Lossy Networks", Networking Working Group, Internet Draft, draft-ietf-roll-protocols-survey-07, Apr. 2009, 26 pages, The Internet Engineering Task Force.

Zhang, et al., "Research and Design of Redundant Cluster-Head Model in WIA-PA Based on Adaptive Heartbeat Protocol", International Conference on Computational Intelligence and Software Engineering, Dec. 2009, 4 pages, Institute of Electrical and Electronics Engineers, Piscataway, New Jersey.

"RPL: IPv6 Routing Protocol for Low Power and Lossy Networks" <draft-ietf-roll-rpl-19> by Winter, et al., (Mar. 13, 2011 version).

"Routing Metrics used for Path Calculation in Low Power and Lossy Networks"<draft-ietf-roll-routing-metrics-19> by Vasseur, et al. (Mar. 1, 2011 version).

"RPL Objective Function 0" <draft-ietf-roll-of0-15> by Thubert (Jul. 8, 2011 version).

"The Minimum Rank Objective Function with Hysteresis" <draft-ietf-roll-minrank-hysteresis-of-04> by O. Gnawali et al. (May 17, 2011 version).

\* cited by examiner

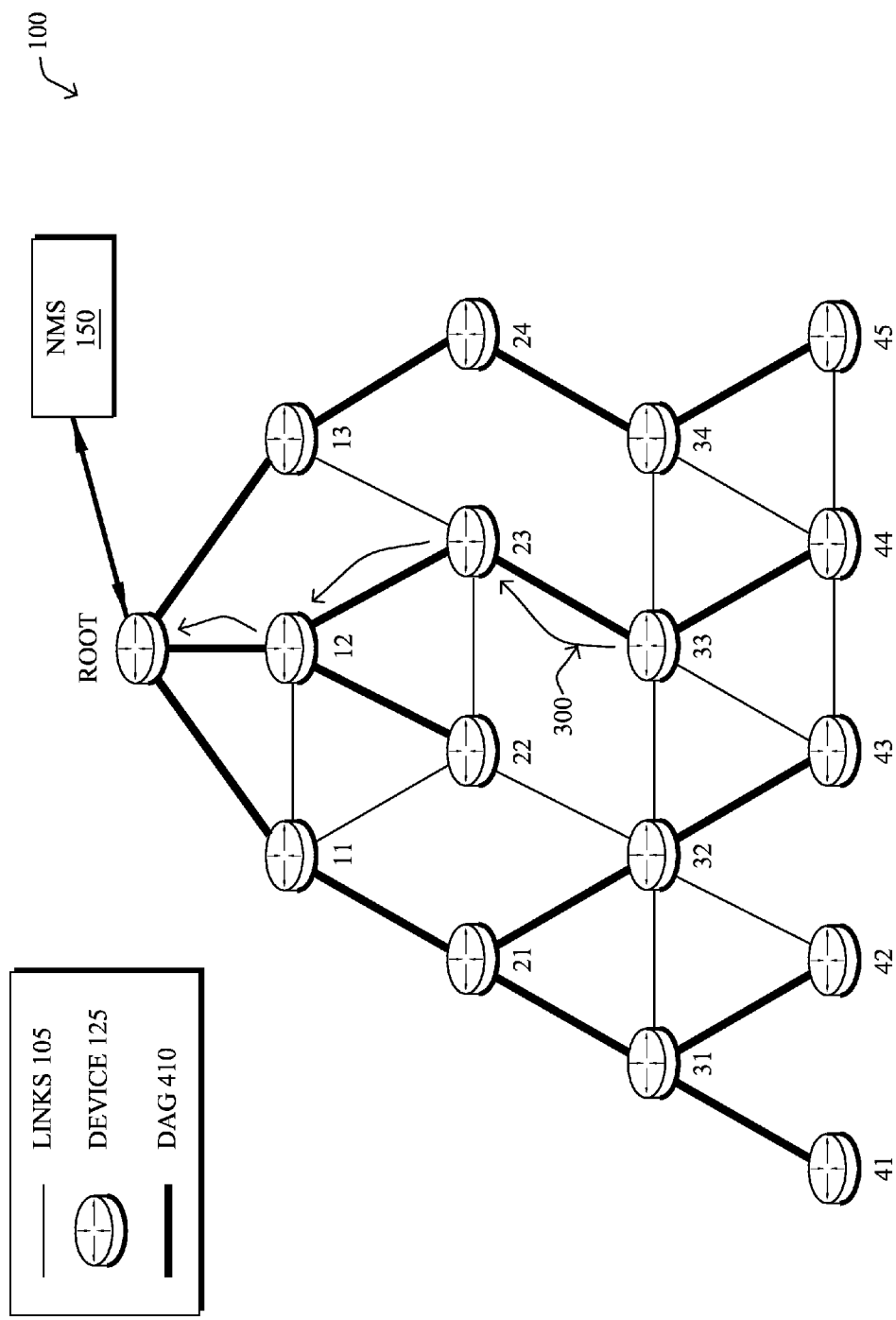

DYNAMIC KEEPALIVE PARAMETERS FOR REVERSE PATH VALIDATION IN COMPUTER NETWORKS

TECHNICAL FIELD

The present disclosure relates generally to computer networks, and, more particularly, to path validation in computer networks, e.g., via keepalive messages.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

One significant challenge with routing in LLNs is ensuring that links to neighboring nodes are valid. More traditional IP networks typically use a proactive keepalive mechanism with a relatively short period, such as the Bidirectional Forwarding Detection (BFD) protocol. Due to the strict resource constraints of LLNs, protocols such as RPL do not rely on proactive keepalive mechanisms. Instead, many LLN protocols typically take a reactive approach, using link-layer acknowledgments and/or IPv6 Neighbor Unreachability Detection (NUD) to update link statistics when forwarding traffic.

One fundamental problem is that nodes in many LLNs only maintain links in the UPWARD direction (toward a root node), and detect link failures reactively when sending a data packet. If a node has no data packets to send, it will not detect the link failure and will not notify the root that the link is no longer valid. As a result, the root will continue to send traffic down an invalid path.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7D illustrate portions of an example progression of reverse path validation.

DESCRIPTION OF EXAMPLE EMBODIMENTS

Overview

Figure 1:
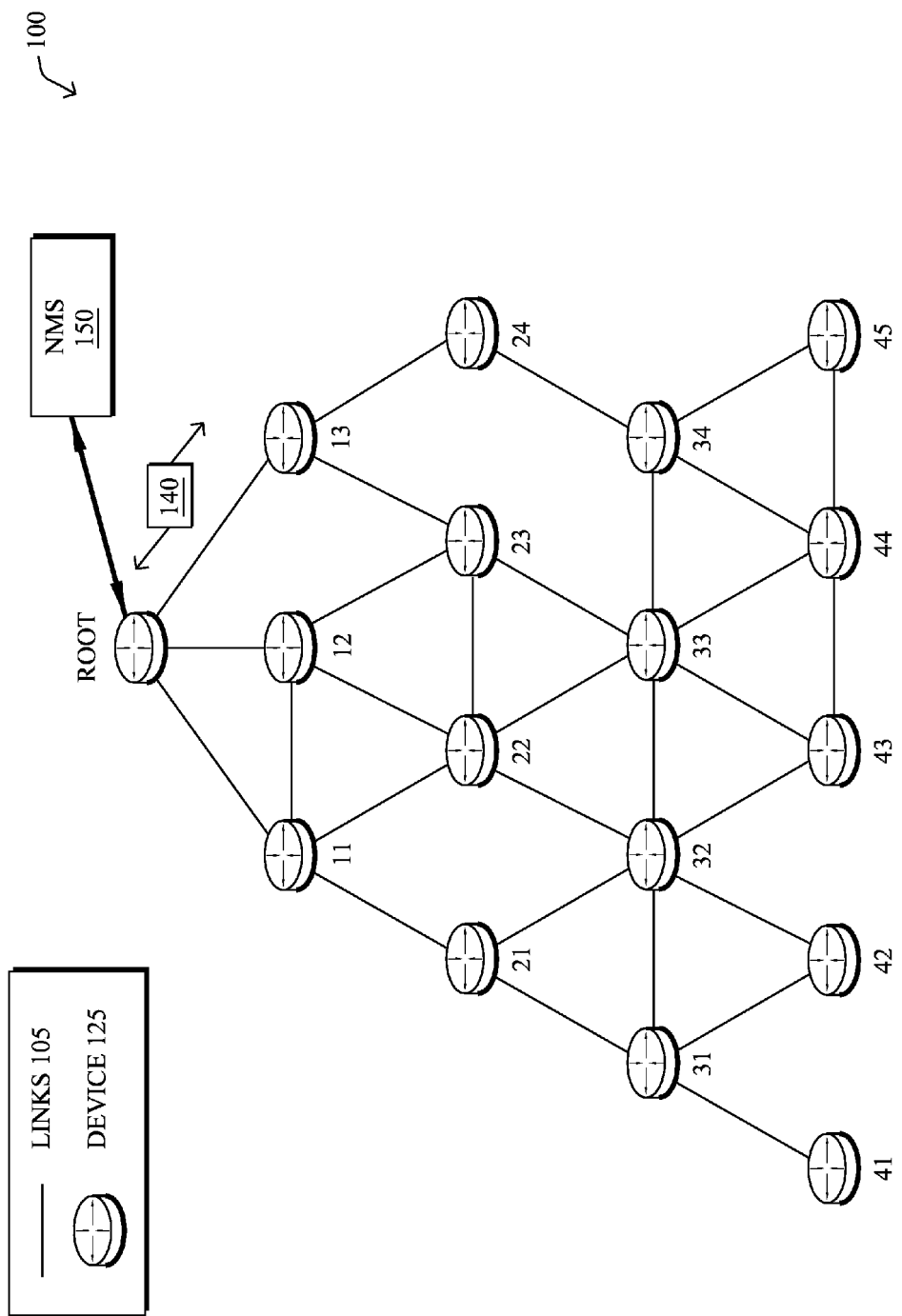
FIG. 1 illustrates an example communication network.

According to one or more embodiments of the disclosure, a network device determines a path from itself to a source device in a computer network, where the source device utilizes the path in reverse to reach the network device. Based on determining a reliability of the path in reverse, the network device may dynamically adjust one or more keepalive parameters for keepalive messages sent on the path. Accordingly, the network device may then send keepalive messages on the path based on the dynamically adjusted keepalive parameters.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 125 (e.g., labeled as shown, "root," "11," "12," . . . "45," and described in FIG. 2 below) interconnected by various methods of communication. For instance, the links 105 may be wired links and/or shared media (e.g., wireless links, PLC links, etc.), where certain nodes 125, such as, e.g., routers, sensors, computers, etc., may be in communication with other nodes 125, e.g., based on distance, signal strength, current operational status, location, etc. In addition, various other devices, such as a head-end application device or a network management server (NMS) 150 may be present in the network 100, such as via a WAN reachable by node 11-45 through the root node. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
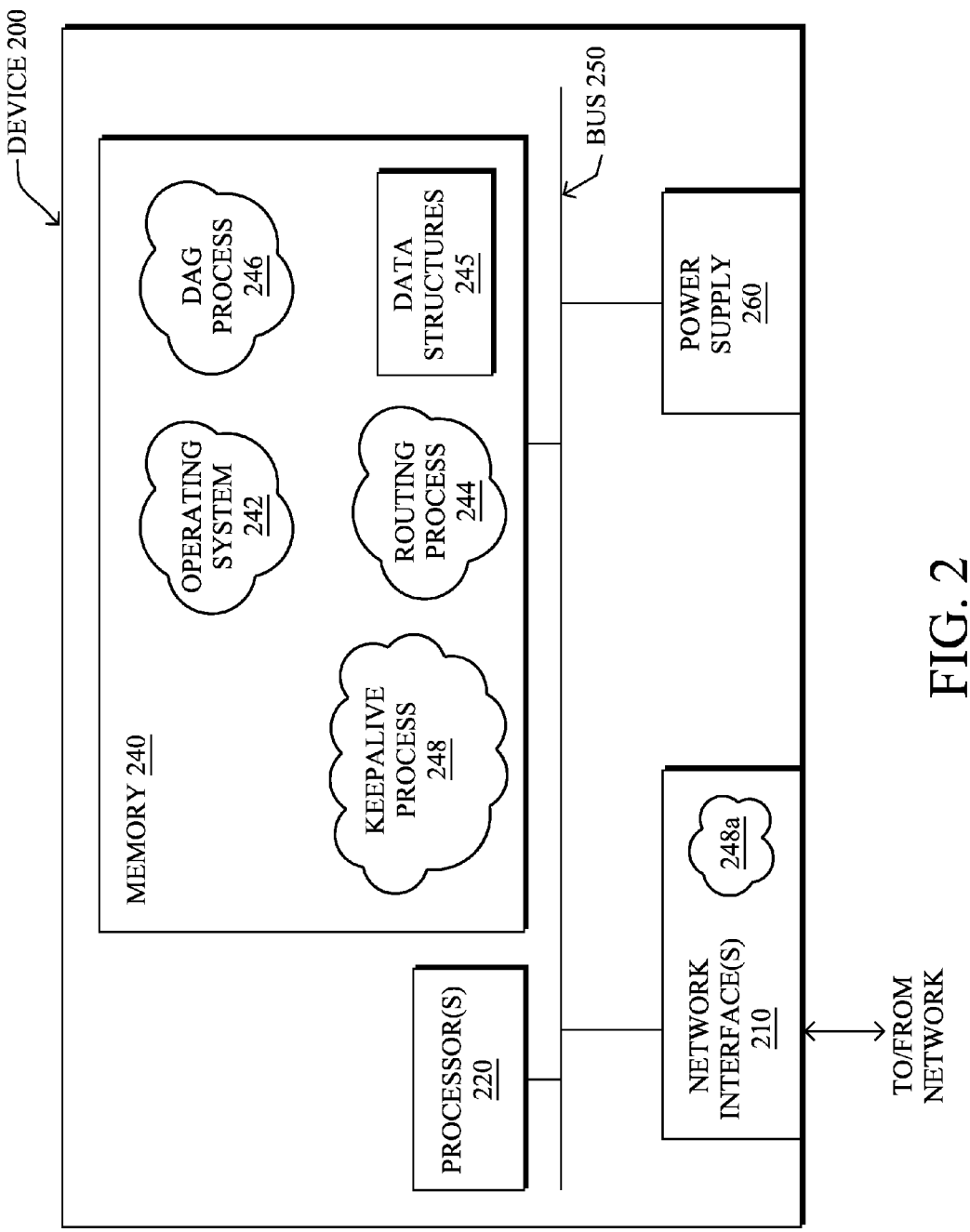
FIG. 2 illustrates an example network device/node.

FIG. 2 is a schematic block diagram of an example node/device 200 that may be used with one or more embodiments described herein, e.g., as any of the devices 125 shown in FIG. 1 above, and also NMS 150. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

It should be noted that PLC lines share many characteristics with low power radio (wireless) technologies. In particular, though each device in a given PLC network may each be connected to the same physical power-line, a PLC link is very much a multi-hop link, and connectivity is highly unpredictable, thus requiring multi-hop routing when the signal is too weak. For instance, even in a building the average number of hops is between two and three (even larger when having to cross phases), while on an AMI network, on the same power phase line, the number of hops may vary during a day between one and 15-20. Those skilled in the art would recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative keepalive process 248, as described herein. Note that while keepalive process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of0-15> by Thubert (Jul. 8, 2011 version) and "The Minimum Rank Objective Function with Hysteresis"<draft-ietf-roll-minrank-hysteresis-of-04> by O. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
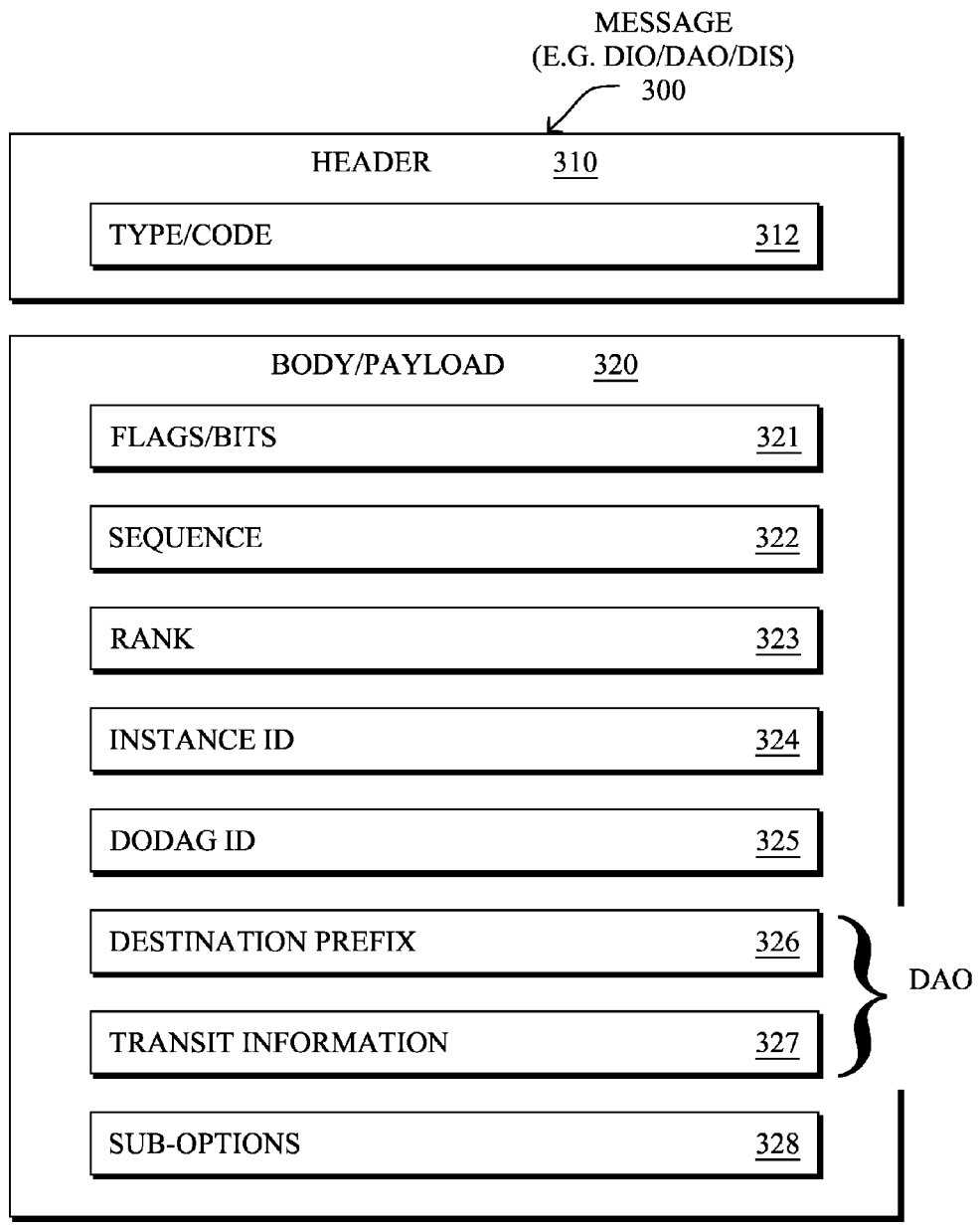
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
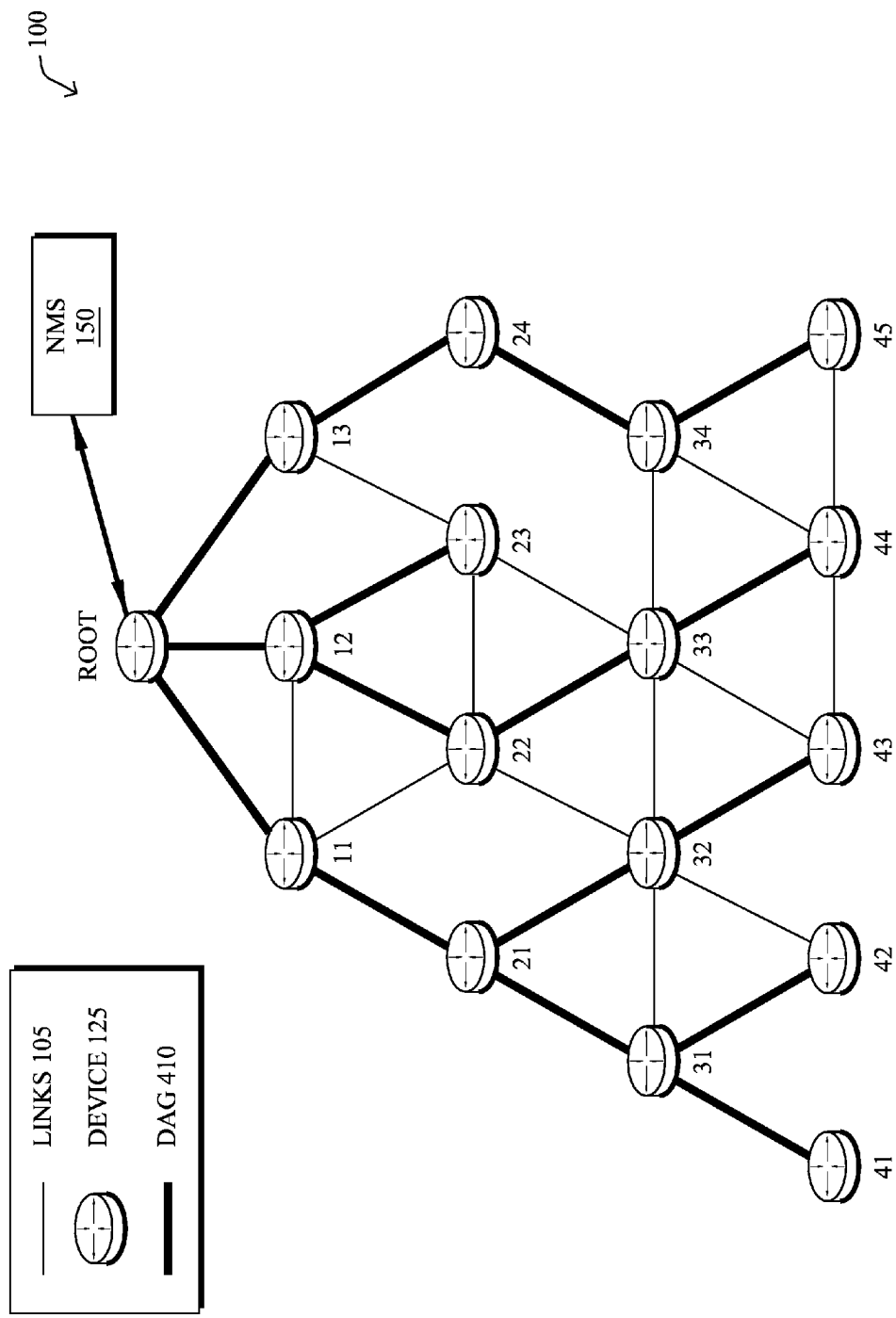
FIG. 4 illustrates an example directed acyclic graph (DAG) in the communication network as in FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, one significant challenge with routing in LLNs is ensuring that links to neighboring nodes are valid. More traditional IP networks typically use a proactive keepalive mechanism with a relatively short period, such as the Bidirectional Forwarding Detection (BFD) protocol. Due to the strict resource constraints of LLNs, protocols such as RPL do not rely on proactive keepalive mechanisms. Instead, many LLN protocols typically take a reactive approach, using link-layer acknowledgments and/or IPv6 Neighbor Unreachability Detection (NUD) to update link statistics when forwarding traffic.

Consider, for example, the illustrative cases of a packet 140 sent in the UPWARD direction (i.e., from a network device in the DAG 410 toward/to the root) and in the reverse DOWNWARD direction, (i.e., away from the root toward a particular network device). First, in the UPWARD direction, assume that link 33-22 is down. When node 33 attempts to forward a packet in the UPWARD direction across link 33-22, the node 33 will detect that the link is down, and attempts to select an alternate next-hop (e.g., node 23) or else trigger a local routing repair to find another set of next-hops to send the packet. This reactive approach works well in the UPWARD direction. However, as described below, such a reactive approach does not work as well in the DOWNWARD direction.

In particular, for the DOWNWARD direction, consider a packet 140 sent from the root to node 33. When using source routing, the root will determine a source route from the root to node 33 (e.g., root-12-22-33), append the source route (e.g., using an IPv6 Routing Header), and forwards the packet to node 12. However, when the packet reaches the failing link (e.g., link 22-33), the packet will be dropped.

The fundamental problem is that nodes only maintain links in the UPWARD direction and detect link failures reactively when sending a data packet (generally to avoid proactive keepalive messages). If node 33 has no data packets to send, it will not detect the link failure and will not notify the root that link 22-33 is no longer valid. As a result, the root will continue to send traffic down an invalid path.

Unlike forwarding packets in the UPWARD direction, it is much more difficult to build and repair a routing topology when detecting link failures in the downward direction. In particular, many LLN protocols (e.g., RPL) build routing topologies in the UPWARD direction and reverse the links for use in the DOWNWARD direction. With such protocols, it is the responsibility of devices to maintain their links towards the root. In particular, if node 22 detects that link 22-33 is down, it cannot simply send a message to node 33 to find a new path.

Note that in certain systems, such as unconstrained IP networks, nodes can send regular proactive keepalive messages, then the routing topology will be kept up-to-date on the timescales of the keepalive period. While a short keepalive period will detect link failures more quickly, doing so is costly in resource-constrained environments such as LLNs (e.g., limited energy and channel capacity). In addition, the root could also maintain multiple (diverse) paths and send multiple copies of the packet along each path to increase the likelihood of at least one being received by the destination. However, applying this technique to all traffic is also costly in resource-constrained environments.

Dynamic Keepalive Parameters

The techniques herein allow a network device dynamically adjust parameters for sending keepalive messages on a path (e.g., an UPWARD path) based on observing the reliability of a corresponding reverse path toward the network device (e.g., a DOWNWARD path). Illustratively, this may be achieved by having message sources (e.g., a DAG root) include a retransmission count for each packet sent on the reverse path, such that network nodes (e.g., destination devices) can monitor the reliability of the reverse path by observing the retransmission counts, and dynamically adjusting the frequency and/or scope of sending keepalive messages on the path.

Specifically, according to one or more embodiments of the disclosure as described in detail below, a network device determines a path from itself to a source device in a computer network, where the source device utilizes the path in reverse to reach the network device. Based on determining a reliability of the path in reverse, the network device may dynamically adjust one or more keepalive parameters for keepalive messages sent on the path. Accordingly, the network device may then send keepalive messages on the path based on the dynamically adjusted keepalive parameters.

Illustratively, the techniques described herein may be performed by hardware, software, and/or firmware, such as in accordance with the keepalive process 248/248a, which may contain computer executable instructions executed by the processor 220 (or independent processor of interfaces 210) to perform functions relating to the novel techniques described herein, e.g., in conjunction with routing process 244 (and/or DAG process 246). For example, the techniques herein may be treated as extensions to conventional protocols, such as the RPL protocol or else various communication protocols, and as such, may be processed by similar components understood in the art that execute those protocols, accordingly.

Operationally, a network device (e.g., node 33) first determines a path from itself to a source device in a computer network, such as a parent node (e.g., node 22) for DAG 410 toward the root device (path 33-22-12-root). According to many LLN routing protocols, such as RPL, the source device utilizes the path in reverse to reach the network device (reverse path root-12-22-33).

In addition, in one or more particular embodiments, an acceptable reliability threshold and an unacceptable reliability threshold may be determined by the network devices, such as on an individual device basis or else based on global (e.g., network) based configuration. For instance, the thresholds may be common for all nodes in the network, or else these values may be preconfigured out-of-band or communicated via a configuration service (e.g., by the NMS 150 or a Dynamic Host Configuration Protocol (DHCP) server, etc.). Note that the reliability may be based on a numerical value that is inversely proportional to the reliability, such as a retransmission count "C" value that indicates a number of attempts to reach the network device. As such, the thresholds, such as illustrative values Cmin(n) and Cmax(n), may represent a reliability minimum and maximum threshold, respectively, that are used to trigger the keepalive adjustment (adaptation) described herein, where, in particular, surpassing the maximum threshold indicates an unacceptable reliability, while surpassing the minimum threshold indicates a great reliability (i.e., more than simply acceptable).

Figure 5:
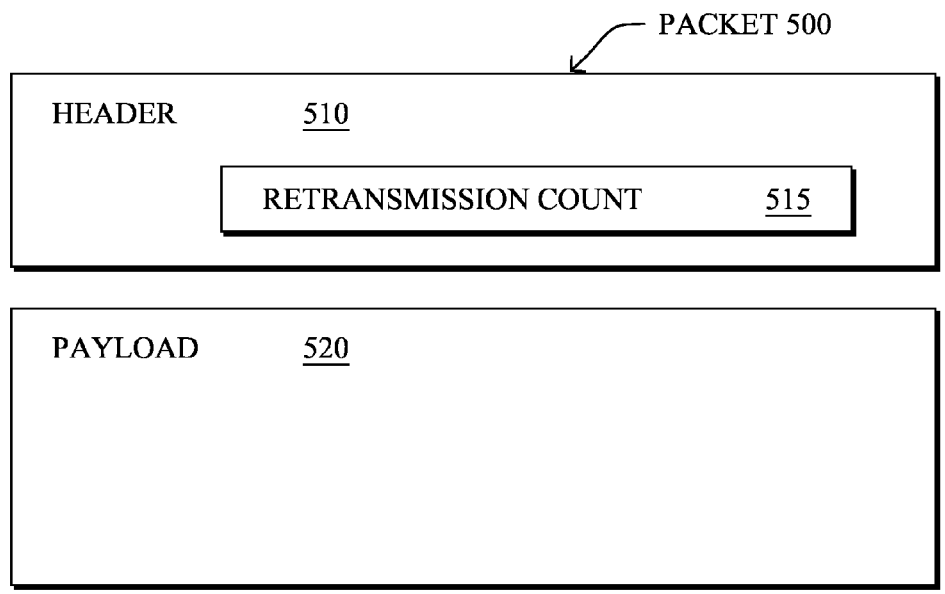
FIG. 5 illustrates an example packet format.

According to the techniques herein, each configured network device (e.g., node 33) also determines a reliability of the reverse path. Illustratively, the reliability may be based on the retransmission count, C, which may be carried in the packets 140. For example, FIG. 5 illustrates an example packet format 500 (e.g., a packet 140), where the packet 500 contains a header 510 and a payload 520, as may be appreciated by those skilled in the art. In particular, the header 510 generally carries the information used to forward the packet 500, such as source and destination addresses, labels, encapsulations, etc., and may include a retransmission count field 515. Note that in certain embodiments, field 515 may be specifically located within an extension to the header 510 (an "extension header"), which may comprise one or more additional fields.

Generally, the retransmission count is set by the source. The first time a source transmits a packet, such as a data message to the network device, the retransmission count 515 is set to 0. Each time the source retransmits the packet (e.g., in response to not receiving an acknowledgment), the source increments the retransmission count. The retransmission count 515 may be embodied within an IPv6 Destination Option, a few bits of a "DS Byte" of the IPv6 header used for that purpose, a transport-layer header, or an application-layer header.

By observing the retransmission count field 515 contained in messages received at the network device from the reverse path, the network device may correspondingly determine the reliability of the reverse path. Note that other reliability measures may be used, such as the ETX metric, or other packet delivery ratio (PDR), etc. Once the network device, generally as the destination node for the packet(s) 500 (140), processes the reliability (e.g., the retransmission count) for the reverse path (e.g., DOWNWARD) packets, one or more keepalive parameters may be dynamically adjusted/adapted for keepalive messages sent on the path based on the reliability of the reverse path, accordingly.

Notably, the reliability information collected by a network device may be based on an immediate occurrence (e.g., a retransmission count, C, greater than a certain number), or may be based on historical data about the reliability of downward paths to the network device, such as surpassing a threshold for a given period of time, or surpassing it a certain number of times within a given period of time, etc.

Illustrative keepalive parameters that may be dynamically adjusted/adapted for keepalive messages may comprise a rate at which keepalive messages are sent, and/or a scope for which keepalive messages are sent. For instance, assume that F(i) is the frequency of sending keepalive messages by node "i," e.g., where F(33)=0.4 may indicate that node 33 sends one keepalive every 0.4 seconds). As described herein, F(i) (the rate) may be increased (i.e., the value decreased) in response to the reliability surpassing an unacceptable reliability threshold, and decreased in response to the reliability surpassing an acceptable reliability threshold.

In addition, assume that S(i) is the scope (i.e., hop distance) of the keepalive destination. The scope may indicate sending keepalives to a one-hop (next-hop) neighbor or an N-hop neighbor. For example, S(33)=3 indicates that node 33 sends keepalive messages with TTL=3. When S(n)=infinity (defined as the maximum value of the TTL) the keepalive message is sent to the source device, e.g., DAG root, and is thus used to verify the entire path to the source device. Similarly, S(i) (the scope) may be increased in response to the reliability surpassing an unacceptable reliability threshold, and decreased in response to the reliability surpassing an acceptable reliability threshold, as described in detail herein.

Figure 6A:
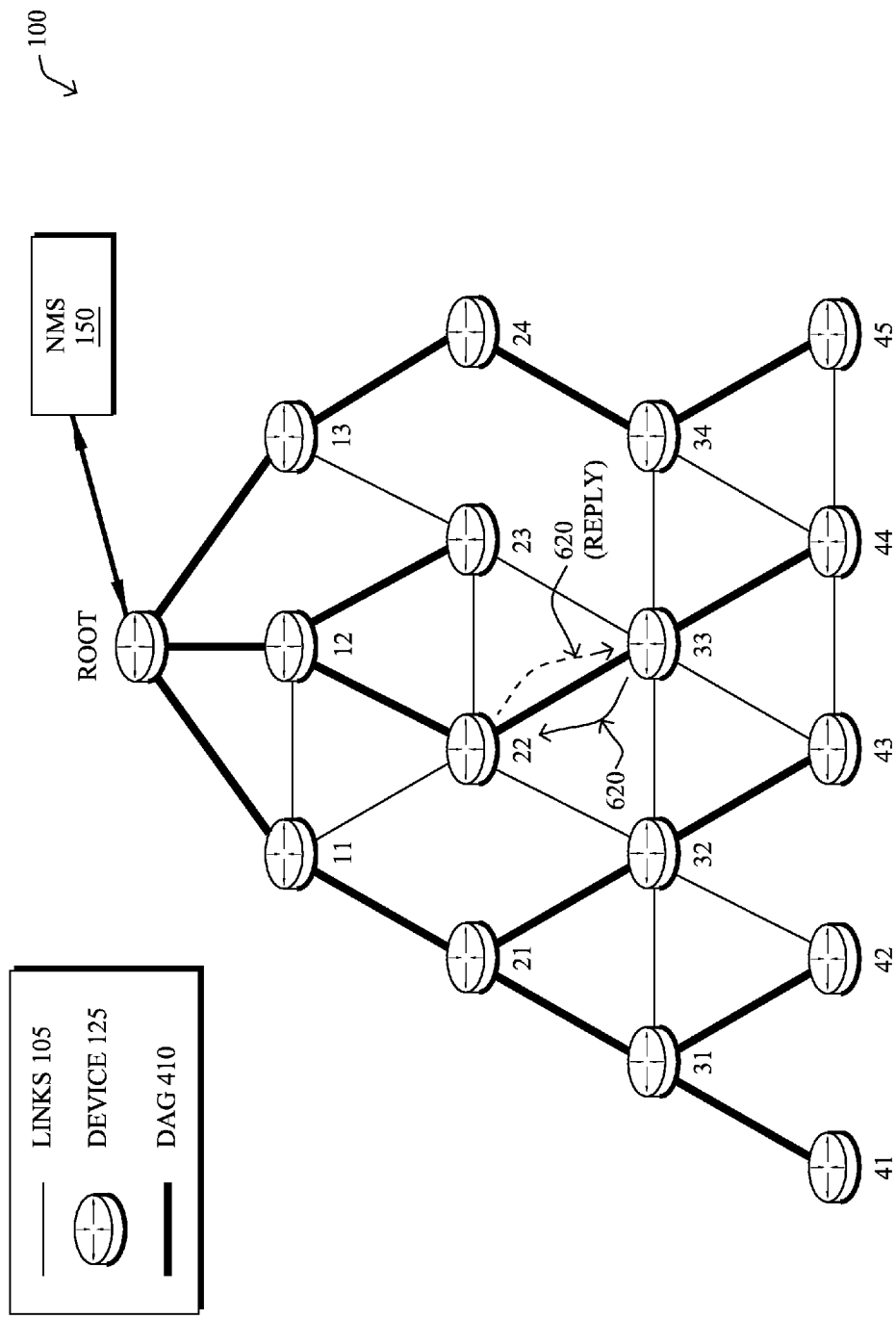
FIGS. 6A-6B illustrate example keepalive message scopes.
Figure 6B:
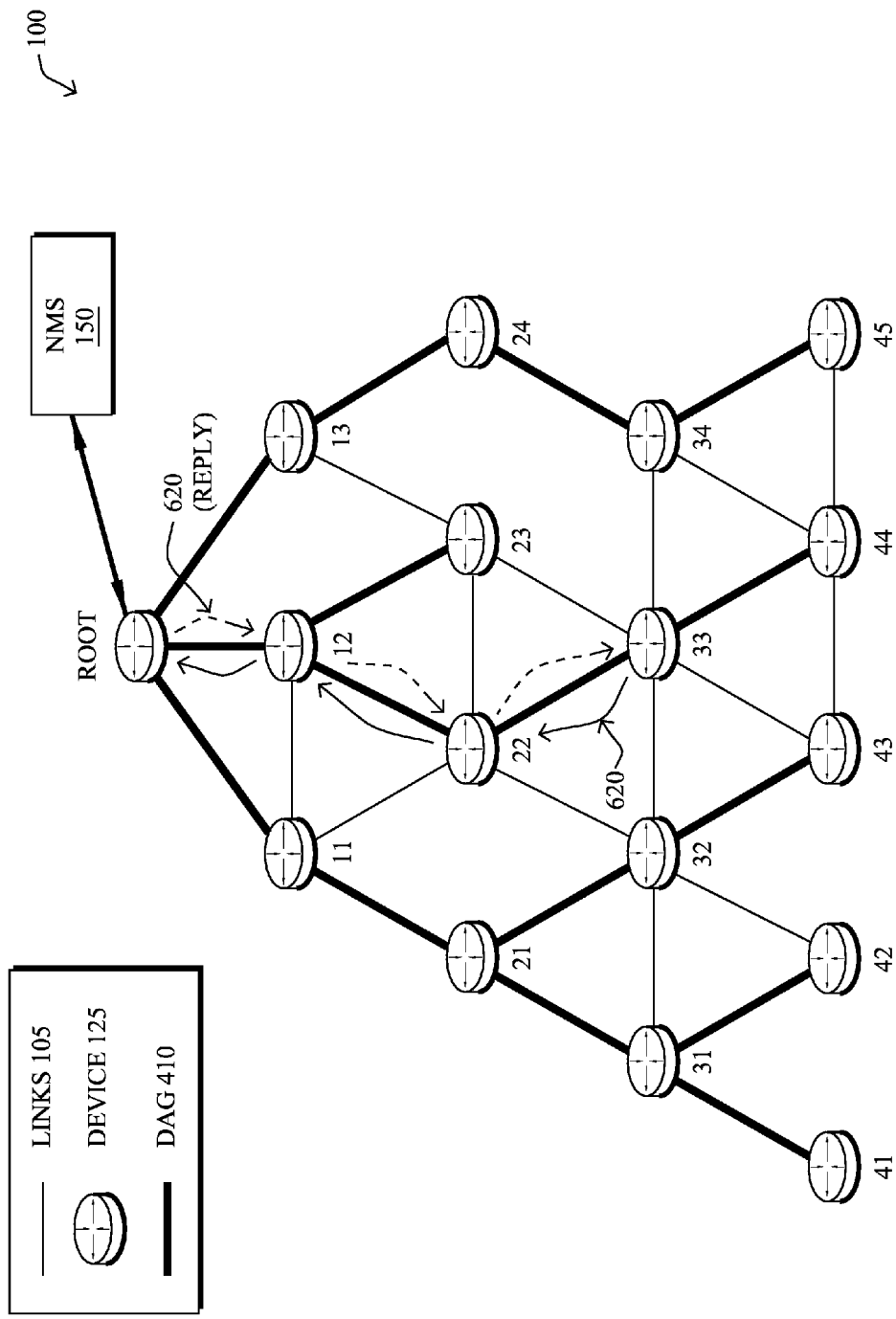

Illustratively, FIGS. 6A-6B show how the scope of the keepalive message may be sent as a single-hop keepalive message to a next-hop node on the particular path (i.e., where S(i)=1), or a multi-hop keepalive up to and including being scoped as a full-path keepalive message toward the source (S(i)=2 through infinity, respectively). For instance, in a first embodiment shown in FIG. 6A, the destination node itself may be the only node required to send a keepalive message 620, such as from node 33 to 22 (link 33-22). In another embodiment, as shown in FIG. 6B, the scope of the keepalive message may be increased up to the source device (e.g., root) in order to check the entire path. Note that in one embodiment, whether to increase the scope of the keepalive messages at all may be locally configured, or else may be based on certain device characteristics (e.g., capability and/or location in the network), such as for critical devices.

As an example adjustment, if the number of retransmissions exceeds Cmax(i) for a period of time, the network device (e.g., node 33) may adjust the keepalive parameters in an attempt to more closely reflect the state of the reverse path (e.g., DOWNWARD) through keepalive messages on the path (e.g., UPWARD). For example, the network device may decrease F(i) to increase the keepalive transmission rate, while alternatively or in addition, it may increase S(i) to increase the scope of keepalive transmissions. For instance, one mode of operation may consist of incrementing T(i) and/or S(i), waiting T seconds, observing the rate of retransmissions, then incrementing T(i) and/or S(i) again. Said differently, the rate and/or scope may be adjusted in increments in response to the reliability continuing to surpass the reliability threshold.

Similarly, if the number of retransmissions falls below Cmin(i) for a period of time, the network device may adjust the keepalive parameters in the other direction. For example, the network device may increase F(i) to decrease the keepalive transmission rate, or else (or in addition) may decrease S(i) to decrease the scope of the keepalive transmissions, where again, these adjustments may be incremental as noted above.

Note that controlling the scope S(i) enables a different but important capability from F(i). For example, a device may first choose to increase F(i). However, if after increasing F(i), node i determines that the number of retransmissions is not decreasing, node i may choose to increase the scope S(i). For example, suppose that the Packet Delivery Ratio (PDR) of link 22-33 is 90% but the PDR of the link 12-22 is only 60%. Node 33 may start decreasing the value of F(i), which may have a limited effect on the end-to-end path reachability if the node 22 does not also decrease its own F(22) value.

For example, assume that 60% is an acceptable reliability, and as such, node 22 may not see a need to adjust its keepalive parameters. By traversing both the 12-22 link and 22-33 link, however, the 60% and 90% combine to a possible end-to-end PDR of approximately 54%, which may fall below the reliability threshold for node 33. Accordingly, node 33 may increase its keepalive rate, but since link 22-33 is a relatively good link (90% PDR), no routing changes may occur based on a single-hop keepalive, as node 22 is not also adjusting its own parameters. (Note also that node 22 may simply not support the techniques herein.) In this case, according to this embodiment, when increases to the keepalive rate are unsuccessful in generating an acceptable reverse path, node 33 may decide to start increasing the value of S(33) using an incremental approach. As such, in this example, node 22 is eventually "passed," and the keepalives may reach node 12, or even the root node (source node) directly, to create greater keepalive accuracy (but at the cost of greater control plane overhead).

Note that in further embodiments, other arrangements and/or combination of parameter adjustments may be made, such as depending upon configuration, node criticality, node depth in a DAG, etc. For example, certain nodes may only adjust the rate, while others may adjust both. Still other nodes may be configured to adjust both the scope and rate simultaneously, while others may first attempt to increase the rate and then when unsuccessful, follow up with scope increases. Further, some nodes in certain embodiments may adjust keepalive scope without adjusting the rate of the keepalives. The examples herein are therefore meant to illustrate one or more possibilities of keepalive parameter adjustment, and are not meant to limit the disclosure.

In another embodiment, a network device may cancel (i.e., suppress) sending one or more particular keepalive messages if a data packet is originated by the device on the path (e.g., in the UPSTREAM direction) or if the node relays (routes) a packet originated by one of its children since such a data packet will trigger potential repair should the DOWNSTREAM path be broken, thus rendering a similarly timed keepalive moot. In other words, the techniques herein allow for keepalive messages to be suppressed when replaced with a data packet on the path and an acknowledgement to the data packet on the path in reverse (the reverse path). For example, if node 33 is sending a data packet to the root node (e.g., originating the packet or else having been received from a child node), the acknowledgment to that packet may be treated as an implicit keepalive request/reply exchange to validate the reverse path, without the need for an explicit keepalive message.

According to the techniques herein, therefore, by dynamically adjusting the values of F(i) and S(i), the parameters for sending keepalive messages in the network is adjusted dynamically to minimize the control plane load subject to the constraints of the SLA (service level agreement) for the DOWNWARD direction. Also, the likelihood that a DOWNWARD path will be valid when it is to be used is greatly increased, without adding excess control traffic (that is, just the right amount of keepalive traffic is maintained based on changing and localized conditions of the network).

Figure 7A:
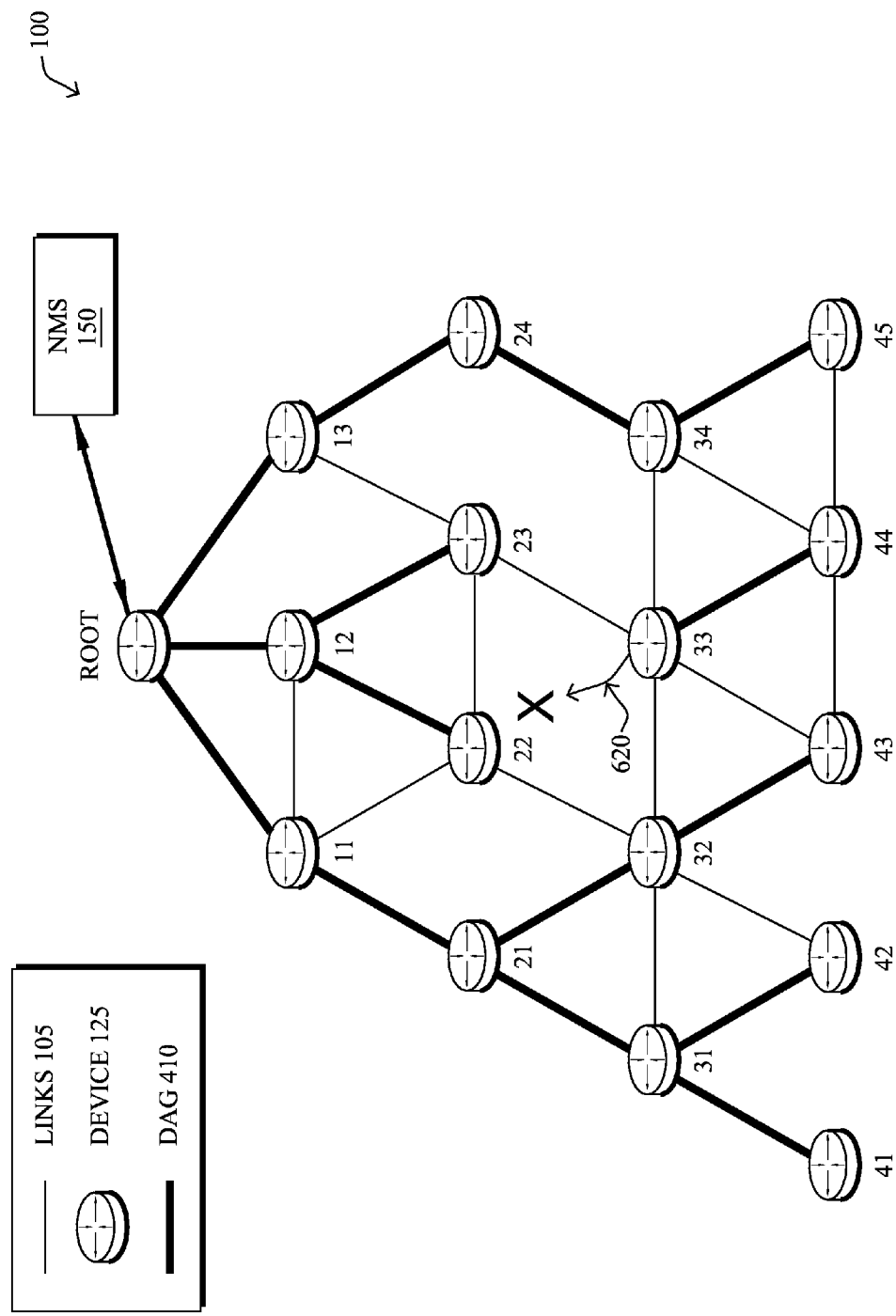
Figure 7B:
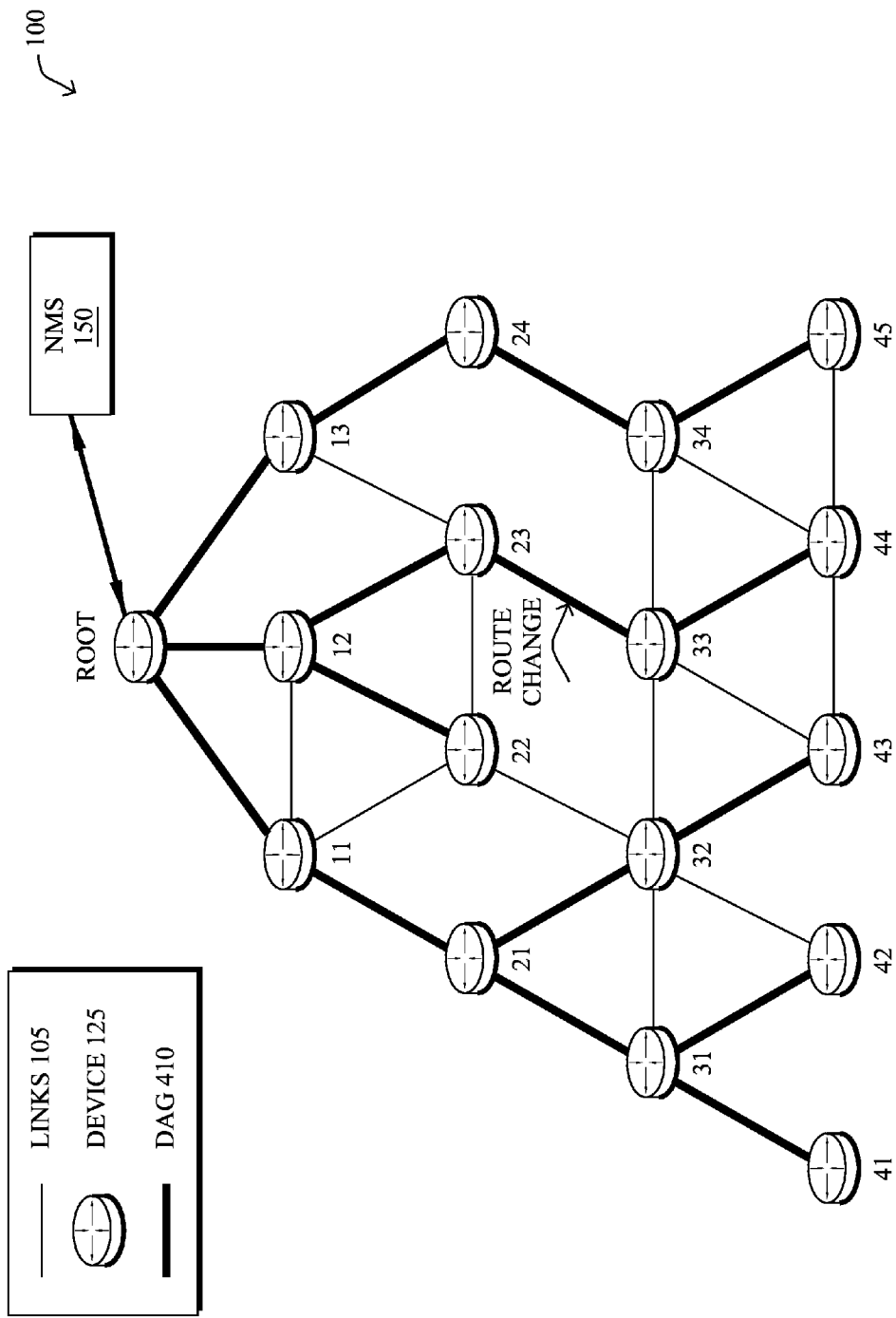
Figure 7D:
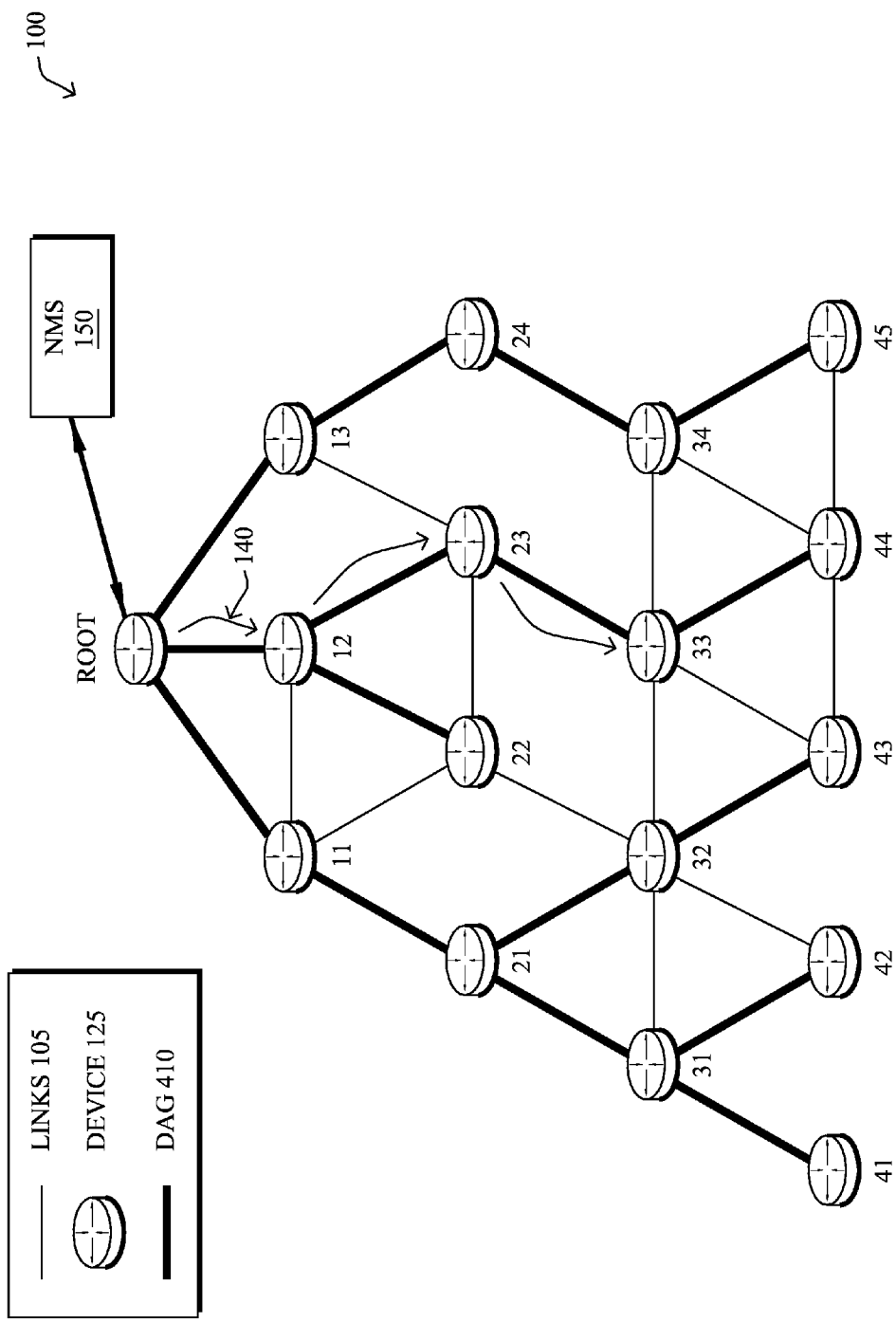

As an illustration, when the network device (e.g., node 33) checks that the local preferred link (e.g., to node 22) is still valid, e.g., by sending a keepalive message 620 according to the keepalive parameters, such as shown in FIG. 7A, if the next-hop link is valid, the procedure stops. On the other hand, in response to a failure of the keepalive message on the path, the network device proactively repairs the broken path to the source with a route change, e.g., as shown in FIG. 7B (for example, via node 23). The route change may be based on switching to an alternate next-hop/parent, re-building the local topology and re-attach to another node in the network, etc. For example, in the case of RPL or other techniques such as MPLS TE, the network device could trigger a local repair. In addition, as shown in FIG. 7C, the network device reports the particular route change to the source (e.g., root), such as by sending a conventional routing message 300 to update the root's routing information. In this manner, in response to failure of the keepalive 620, the destination network device will proactively repair the path and update the root with a new route, and in response to receiving a report from the network device of a particular route change of the path to a new path, the source device then transmits any future message (packet 140) on the new DOWNWARD path (the reverse of the new UPWARD path), as shown in FIG. 7D.

Figure 8:
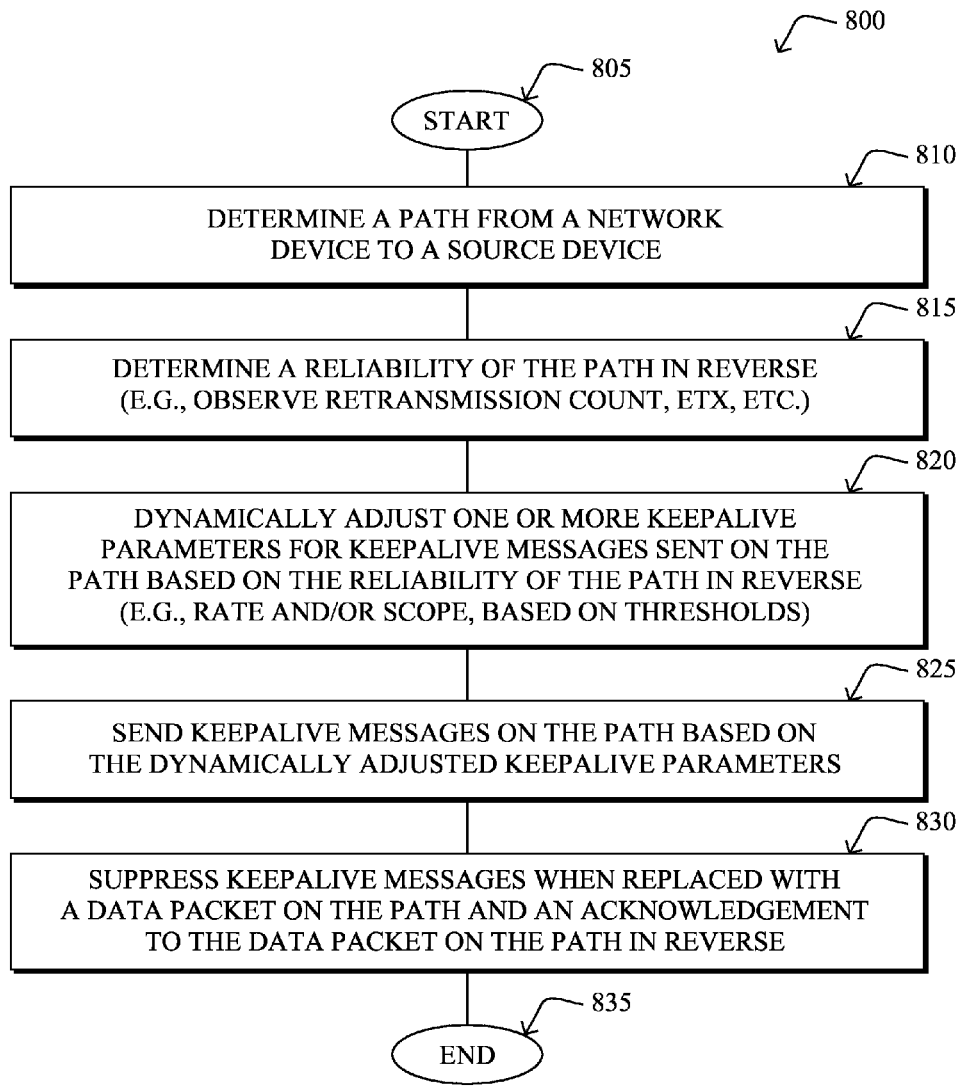
FIG. 8 illustrates an example simplified procedure for dynamic keepalive parameters for reverse path validation.

FIG. 8 illustrates an example simplified procedure for dynamic keepalive parameters for reverse path validation in accordance with one or more embodiments described herein. The procedure 800 starts at step 805, and continues to step 810, where, as described in greater detail above, a network device determines a path from itself to a source device, e.g., based on RPL or other suitable protocols, where the source device, e.g., root device, uses that path in reverse to reach the network device. As described above, in step 815 the network device may monitor/determine a reliability of the path in reverse, such as by observing a retransmission count, ETX values, packet delivery rates, etc.

As detailed herein, in step 820, the network device may then correspondingly dynamically adjust one or more keepalive parameters (e.g., rate and/or scope) for keepalive messages sent on the path based on the reliability of the path in reverse (e.g., based on thresholds). Accordingly, in step 825, the network device sends keepalive messages 620 on the path (e.g., DAG 410) based on the dynamically adjusted keepalive parameters. Note again that in step 830, the network device may suppress keepalive messages when replaced with a data packet 140 on the path and an acknowledgement to the data packet on the path in reverse. The procedure 800 illustratively ends in step 835, though may return to step 815 to continue to monitor the reliability.

Figure 9:
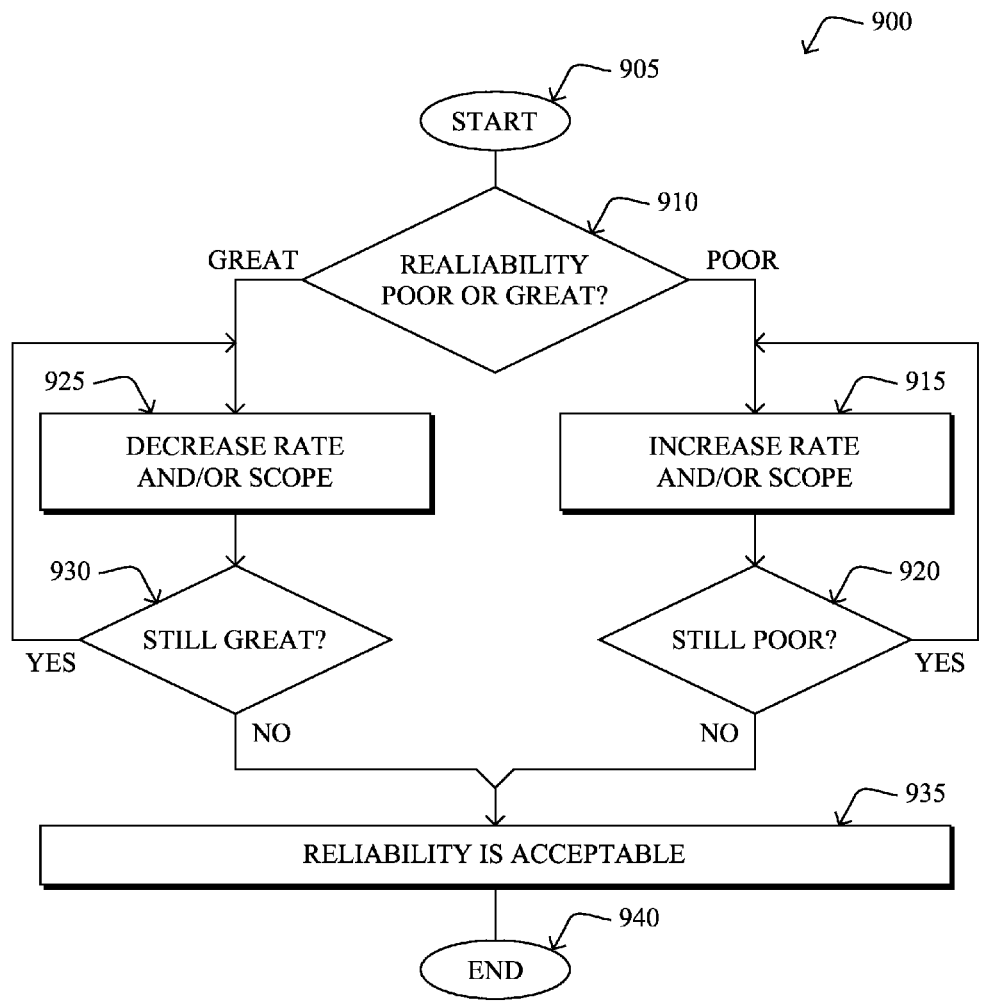
FIG. 9 illustrates another example simplified procedure for dynamic keepalive parameters for reverse path validation.

In addition, FIG. 9 illustrates another example simplified procedure (e.g., a sub-procedure of procedure 800) for dynamic keepalive parameters for reverse path validation in accordance with one or more embodiments described herein. The (sub-) procedure 900 starts at step 905, and continues to step 910, where if the reliability is "poor" (below an unacceptable threshold), then in step 915 the adjustment to the keepalive parameters (step 820 above) may be to increase the rate and/or scope of the keepalives as described above. If the reliability is still poor in step 920, e.g., after re-monitoring the reliability (step 815 above), then the procedure 900 may return to step 915 to increment (increasingly) the rate and/or scope (e.g., first the rate, then the scope, as mentioned above, or else other possible combinations) until the reliability is acceptable in step 935. Alternatively, if in step 910 the reliability is "great" (above the acceptable threshold), then in step 925 the network device may decrease the rate and/or scope, e.g., in increments (decreasingly), until it is determined in step 930 that the reliability is no longer great, that is, is simply acceptable in step 935 (neither above the acceptable threshold nor below the unacceptable threshold). The (sub-) procedure 900 then illustratively ends in step 940, until further adjustments to keepalive parameters may be required as described herein.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The novel techniques described herein, therefore, provide for dynamic keepalive parameters for reverse path validation in a computer network. In particular, the techniques herein dynamically adjust keepalive parameters in response to reverse path reliability. Thus, keepalives may be sent in corresponding areas of the network (which may change frequently) at different rates, to the point where if the local network is stable, no (or limited) keepalives need to be used. Accordingly, the techniques herein address a significant issue in networks that use reverse path routing, significantly improving the path reliability and SLA, particularly in constrained networks. Also, by dynamically adjusting the rate and scope of keepalive messages, network devices minimize overhead caused by keepalive messages. Additionally, by allowing keepalive messages to traverse multiple hops, networks can include devices that do not implement the techniques herein, helping to improve the path reliability even more.

While there have been shown and described illustrative embodiments that provide for dynamic keepalive parameters for reverse path validation in a computer network, it is to be understood that various other adaptations and modifications may be made within the spirit and scope of the embodiments herein. For example, the embodiments have been shown and described herein with relation to LLNs. However, the embodiments in their broader sense are not as limited, and though well-suited for constrained networks, may, in fact, be used with other types of networks and/or protocols. In addition, while certain protocols are shown, such as RPL, other suitable protocols may be used, accordingly. Also, while the techniques generally describe the root node as the source device, other devices, particularly head-end nodes and/or network management system/server (NMS) devices, may also source messages.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining a path from a network device to a source device in a computer network, wherein the source device utilizes the path in reverse from the source device to the network device to reach the network device;
   determining a reliability of a plurality of links connecting a plurality of nodes along the path in reverse by the network device;
   dynamically adjusting one or more keepalive parameters for keepalive messages sent on the path based on the reliability of the path in reverse; and
   sending keepalive messages on the path based on the dynamically adjusted keepalive parameters,
   wherein in response to failure of the keepalive messages on the path, the network device repairs a broken path to the source device with a route change.

2. The method as in claim 1, wherein determining the reliability comprises:
   observing a retransmission count contained in messages received at the network device from the path in reverse.

3. The method as in claim 2, wherein the messages are data messages.

4. The method as in claim 1, wherein determining the reliability comprises:
   determining an expected retransmission count (ETX) metric for the path in reverse.

5. The method as in claim 1, wherein adjusting the keepalive parameters comprises:
   adjusting a rate at which keepalive messages are sent.

6. The method as in claim 5, wherein adjusting further comprises:
   increasing the rate in response to the reliability surpassing an unacceptable reliability threshold; and
   decreasing the rate in response to the reliability surpassing an acceptable reliability threshold.

7. The method as in claim 6, further comprising:
   adjusting the rate respectively in increments in response to the reliability continuing to surpass the corresponding reliability threshold.

8. The method as in claim 1, wherein adjusting the keepalive parameters comprises:
   adjusting a hop distance for which keepalive messages are sent.

9. The method as in claim 8, wherein adjusting further comprises:

increasing the hop distance in response to the reliability surpassing an unacceptable reliability threshold; and decreasing the hop distance in response to the reliability surpassing an acceptable reliability threshold.

10. The method as in claim 9, further comprising:

adjusting the hop distance respectively in increments in response to the reliability continuing to surpass the corresponding reliability threshold.

11. The method as in claim 1, wherein adjusting the keepalive parameters comprises:

adjusting a rate at which keepalive messages are sent and a hop distance for which keepalive messages are sent.

12. The method as in claim 11, wherein adjusting further comprises:

increasing the rate;

determining that the reliability continues to surpass an unacceptable reliability threshold; and in response, increasing the hop distance.

13. The method as in claim 1, further comprising:

determining an acceptable reliability threshold and an unacceptable reliability threshold on an individual device basis.

14. The method as in claim 1, wherein the source device is a root device of a directed acyclic graph (DAG).

15. An apparatus, comprising:

one or more network interfaces to communicate in a computer network;

a processor coupled to the network interfaces and adapted to execute one or more processes; and a memory configured to store a process executable by the processor, the process when executed operable to:

determine a path from the apparatus to a source device in the computer network, wherein the source device utilizes the path in reverse from the source device to the apparatus to reach the apparatus;

determine a reliability of a plurality of links connecting a plurality of nodes along the path in reverse;

dynamically adjust one or more keepalive parameters for keepalive messages sent on the path based on the reliability of the path in reverse; and send keepalive messages on the path based on the dynamically adjusted keepalive parameters, wherein in response to failure of the keepalive messages on the path, the network device repairs a broken path to the source device with a route change.

16. The apparatus as in claim 15, wherein the process when executed to determine the reliability is further operable to:

observe a retransmission count contained in messages received at the apparatus from the path in reverse.

17. The apparatus as in claim 15, wherein the process when executed to adjust the keepalive parameters is further operable to:

adjust a rate at which keepalive messages are sent.

18. The apparatus as in claim 17, wherein the process when executed to adjust is further operable to:

increase the rate in response to the reliability surpassing an unacceptable reliability threshold; and decrease the rate in response to the reliability surpassing an acceptable reliability threshold.

19. The apparatus as in claim 15, wherein the process when executed to adjust the keepalive parameters is further operable to:

adjust a hop distance for which keepalive messages are sent.

20. The apparatus as in claim 19, wherein the process when executed to adjust is further operable to:

increase the hop distance in response to the reliability surpassing an unacceptable reliability threshold; and decrease the hop distance in response to the reliability surpassing an acceptable reliability threshold.

21. The apparatus as in claim 15, wherein the process when executed to adjust the keepalive parameters is further operable to:

adjust a rate at which keepalive messages are sent and a hop distance for which keepalive messages are sent.

22. A tangible, non-transitory, computer-readable media having software encoded thereon, the software when executed by a processor on a network device operable to:

determine a path from a network device to a source device in a computer network, wherein the source device utilizes the path in reverse from the source device to the network device to reach the network device;

determine a reliability of a plurality of links connecting a plurality of nodes along the path in reverse by the network device;

dynamically adjust one or more keepalive parameters for keepalive messages sent on the path based on the reliability of the path in reverse; and send keepalive messages on the path based on the dynamically adjusted keepalive parameters, wherein in response to failure of the keepalive messages on the path, the network device repairs a broken path to the source device with a route change.

23. The computer-readable media as in claim 22, wherein the software when executed to determine the reliability is further operable to:

observe a retransmission count contained in messages received at the network device from the path in reverse.

24. The computer-readable media as in claim 22, wherein the software when executed to adjust the keepalive parameters is further operable to adjust at least one parameter selected from the group consisting of: a rate at which keepalive messages are sent; and a hop distance for which keepalive messages are sent.

* * * * *